United States Patent [19]

Curcio et al.

[11] 3,801,772
[45] Apr. 2, 1974

[54] IN-DING REPAIR TOOL

[75] Inventors: Joseph Curcio, Southfield; Perry P. Hufstetler, Mt. Clemens; Roger W. Johnson, Rochester, all of Mich.

[73] Assignee: General Motors Corporation, Detroit, Mich.

[22] Filed: Aug. 27, 1973

[21] Appl. No.: 392,070

[52] U.S. Cl. .................................. 219/98, 29/401
[51] Int. Cl. ............................................. B23k 9/20
[58] Field of Search .......... 219/98, 99, 107; 29/401

[56] References Cited
UNITED STATES PATENTS
2,605,658   8/1952   Sanchez .............................. 29/401
2,946,118   7/1960   Steck ................................... 29/401
3,321,607   5/1967   Falcone et al. ...................... 219/98
2,945,118   7/1960   Kelemen et al. .................... 219/98

*Primary Examiner*—J.V Truhe
*Assistant Examiner*—Clifford C. Shaw
*Attorney, Agent, or Firm*—Arthur N. Krein

[57] ABSTRACT

A repair tool for repairing an indented surface area of a sheet metal panel, such as a vehicle body panel, the repair tool including a stud welding gun with an air actuated piston and cylinder mechanism coupled to the welding gun electrode and to a stud latch mechanism whereby a stud can first be welded to the indented metal and then gripped by the latch mechanism after which actuation of the piston and the cylinder mechanism will provide the necessary force for raising the depressed metal to the normal plane of the surrounding sheet metal of the panel.

6 Claims, 5 Drawing Figures

PATENTED APR 2 1974 3,801,772

IN-DING REPAIR TOOL

This invention relates to apparatus for repairing damaged sheet metal and, in particular, to an in-ding repair tool.

Sheet metal panels, such as vehicle body panels, are often damaged, as by hail stones or other objects, in a manner to cause areas of the sheet metal to be deeply depressed relative to the normal plane of the sheet metal panel. Such a deep depression or indentation of the metal in this manner is commonly referred to as an in-ding with the damaged area appearing as a concave surface area extending beneath the normal plane of the panel. This damaged area, in order to be properly repaired, must be brought back into the normal plane of the sheet metal. When this damage is accessible from the underside of the panel, it can readily be raised, for example, by the use of a pick hammer. However, when this damage is not readily accessible from the underside of the panel, the damaged area can be repaired by welding a stud in the center of the depression and then raising this portion of the panel by means of the stud.

In one method of arc welding the end of a metallic stud to a sheet metal panel, a stud is employed having a small projection at its end to be welded. The stud is positioned for welding with the projection located in contact with the workpiece and is biased toward the workpiece by a determined force. Welding of the stud is accomplished by passing current through the stud and workpiece, preferably by the discharge of a capacitor. The current causes the projection, which is relatively small, to disengage almost instantly, allowing the stud to move toward the panel, and produces an arc between the end of the stud and the panel during movement of the former into contact with the latter.

The apparatus for performing this method of welding generally comprises a hand-operated welding gun and an electrical control power pack for supplying welding current to the welding gun. The welding gun functions to hold the stud, position the stud relative to the workpiece and in contact therewith, bias the stud toward the workpiece with a predetermined force, trigger the discharge of a capacitor and conduct the current therefrom through the stud and workpiece.

After the stud has been welded into the center of the depression of the panel, a slide hammer is connected to the stud to effect raising of the depressed metal back up into the plane of the sheet panel member surrounding the previously damaged area. After this is done, the head or collar of the stud is cut off and then the remainder of the stud is removed by grinding or filing to obtain a smooth surface area, or alternately, the entire stud can be removed by grinding or filing.

In the method of removing an in-ding as just described using a stud welded into the concave depression or in-ding, it is necessary to first use a welding gun to weld the stud in place after which the operator would be required to remove the welding gun and then pick up a slide hammer placing the craw thereof over the head of the stud and then effecting operation of the slide hammer to raise the concave surfaced in-ding up to or slightly above its normal surface plane, this latter operation requiring operator skill.

It is therefore an object of the present invention to provide an in-ding repair tool whereby a stud can be installed in the center of an in-ding or concave depression and then gripped and pulled on to raise the depressed metal back to its normal surface plane.

Another object of this invention is to provide an in-ding repair tool including a weld gun in which the electrode thereof is connected to a fluid actuated piston to effect raising of a depressed metal surface area after a stud has been welded thereto by actuation of the welding gun.

These and other objects of the invention are attained by means of an in-ding repair tool for securing a stud to a depression in a sheet metal panel and then raising the depression, the repair tool including a welding gun having a piston retaining shaft and a stud holder probe electrode extending therefrom, a piston being fixed to the shaft with a fluid cylinder reciprocably encircling the piston with one end of the fluid cylinder positioned to abut against the sheet metal panel, the tool having an electrical switch to control a stud welding operation and a valve acutator switch to control operation of the fluid cylinder and piston mechanism of this repair tool.

For a better understanding of the invention as well as other objects and further features thereof, reference is had to the following detailed description of the invention to be read in connection with the accompanying drawings, wherein.

Figure 1:
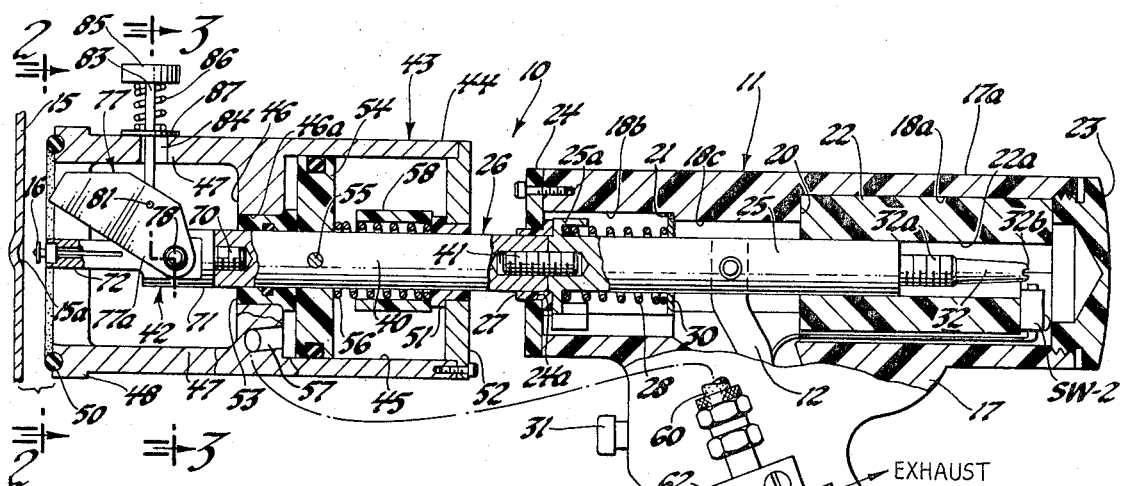
FIG. 1 is a view, partly in section, of an in-ding repair tool in accordance with the subject invention.

Referring now to the drawings, the subject in-ding repair tool, a hand-held tool generally identified by reference numeral 10, includes a commercially available stud welding gun 11 connected by a welding current cable 12 and a control cable 14 to a suitable commercially available electrical control power pack, not shown, which would also include a ground cable, not shown, for attachment to the vehicle body panel 15, on which a weld stud 16 is to be fastened to effect repair in a manner to be described of a depression or concave in-ding 15a in the panel.

The stud welding gun 11 shown is a KSM Bantam C gun available from KSM Welding Systems Division of Omark Industries, Morristown, New Jersey, but modified as hereinafter described.

As shown, the stud welding gun 11 includes a gun housing 17 having a barrel portion 17a and a pistol grip portion 17b, the barrel portion having a longitudinal bore therethrough including an enlarged bore portion 18a at the rear end or right-hand end of the barrel as seen in FIG. 1, an enlarged bore portion 18b at the front end thereof and an intermediate bore portion 18c of reduced diameter therebetween, an intervening shoulder 20 being provided between the bores 18a and 18c and an intervening shoulder 21 between bores 18b and 18c.

A spacer bushing 22 having a bore 22a therethrough is positioned in bore 18a against shoulder 20 and is retained thereagainst by a rear cover 23 suitably secured to the rear end of the barrel portion 17a of the gun housing. The front end of the barrel portion is partly enclosed by a front cover 24 having a central aperture 24a therethrough. The gun housing 17, spacer bushing 22, rear cover 23 and front cover 24 are formed of an electrically non-conducting material, such as a suitable plastic material for this purpose.

Slidably mounted within the barrel portion 17a of the gun housing is the shaft 25 portion of an electrode spindle assembly 26, the rear portion or right-hand end of the shaft 25, as seen in FIG. 1, being slidably journalled in the bore 22a of spacer bushing 22, the electrode spindle assembly 26 being further slidably journalled in a shoulder bushing 27, of nylon for example, extending through the aperture 24a in front cover 24.

Shaft 25 and therefore electrode spindle assembly 26 is normally biased in one direction, in a direction toward the front of the barrel of the gun housing by means of a spring 28 encircling shaft 25 in bore 18b, one end of this spring abutting against a spring retainer washer 30 positioned against shoulder 21 and the other end of the spring abutting against a radial flange 25a extending outward from the front end of shaft 25.

Figure 5:
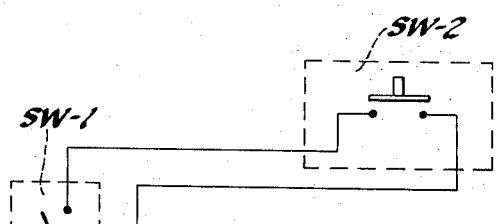
Figure 4:
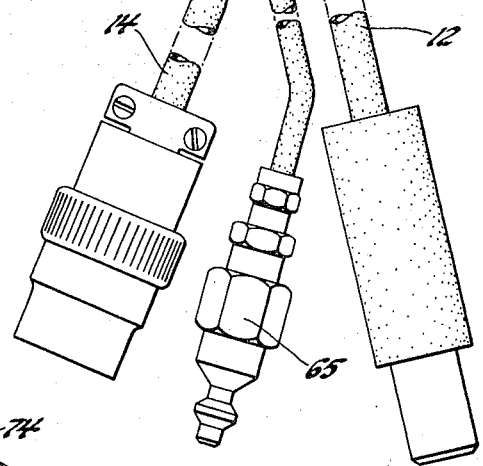
FIG. 4 is an enlarged perspective view of a portion of the stud holder probe electrode of the tool; and, FIG. 5 is a schematic electrical wiring diagram of the actuator switches on the stud welding gun portion of the repair tool of FIG. 1.

Shaft 25 has one end of the welding current cable 12 suitably fixed thereto and this shaft as a part of a conventional electrode spindle assembly would normally have fixed directly thereto a stud holder to retain a weld stud, such as stud 16, to be welded onto a sheet metal panel, the welding gun operator effecting the initiation of the weld cycle by actuation of the trigger button 31 of a normally open switch SW-1, not shown, except schematically in the wiring diagram of FIG. 5, mounted inside the pistol grip portion 17b of the gun, this switch being suitably connected to the conductor wires of control cable 14.

A more detailed description of the stud welding gun 11 is not deemed necessary for an understanding of the invention in the subject repair tool, since as previously described, the stud welding gun is a conventional, commercially available stud welding gun, as thus far described.

However, for a more detailed description of a typical, conventional prior art type stud welding apparatus including the stud welding gun and the electrical circuit of the electrical control power pack for it, reference is made to U.S. Pat. No. 2,945,118, issued July 12, 1960, to Frank K. Keleman and Ralph K. Ritter.

Now, in accordance with a preferred embodiment of the invention, the shaft 25 is provided at one end, the rear or right-hand end as seen in FIG. 1, with an internal threaded bore to adjustably receive the threaded end 32a of a tapered switch acutator rod 32 having an oval-shaped free end 32b, the actuator rod 32 extending axially outward from and concentric with the axis of the shaft 25 in position to actuate the movable contact of a normally open switch SW-2 fixed to a notched rear end portion of the spacer bushing 22, switch SW-2 being connected in series with switch SW-1 to the conductor wires of control cable 14, as seen in FIG. 5.

Now, in accordance with the invention, the electrode spindle assembly 26 of the subject repair tool includes a piston shaft 40, fixed at one end to shaft 25, as by threaded stud 41 engaged in both of these elements and, at its other end is secured to a stud holder probe electrode 42 adapted to hold the weld stud 16. The end of piston shaft 40, fixed to shaft 25, is slidably journalled in bushing 27, for example, of nylon, of the stud welding gun 11 and the probe electrode 42 extends axially through a fluid cylinder 43.

Figure 2:
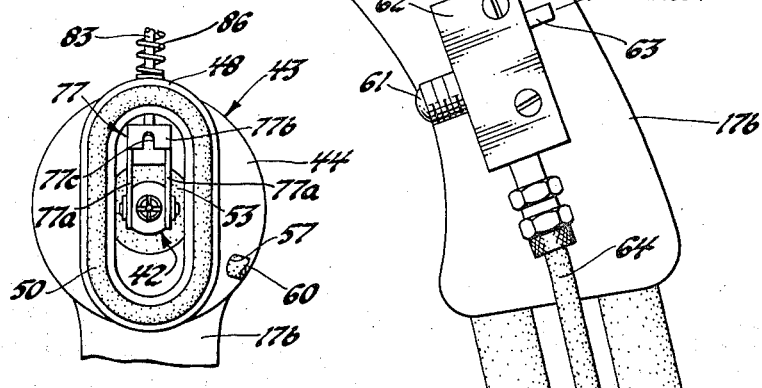
FIG. 2 is an end view taken along line 2—2 of FIG. 1.

Cylinder 43 has a piston receiving cylindrical portion 44 at one end thereof adjacent to the stud welding gun 11, with a longitudinally extending bore 45 therein which terminates at a radial inward extending wall 46 having a bore 46a therethrough. Cylinder 43 further includes a pair of spaced apart web legs 47 extending axially outward from wall 46, opposite cylinder portion 44, to support an oval-shaped seat or foot portion 48, as best seen in FIG. 2, which is provided with a suitable groove on the other free face surface thereof to receive an O-ring 50 which is secured therein, as by means of a suitable adhesive.

The piston shaft 40 is mounted for reciprocable movement relative to the cylinder 43 by being suitably journalled in a shoulder bushing 51 extending through the apertured end cap 52 fixed to the free end of the cylindrical portion 44 of the cylinder 43 to partly close off the open end thereof and, in a shouldered bushing 53 positioned in the bore 46a of wall 46, these bushings also being made of a suitable material, such as nylon. The piston shaft 40 carries a piston 54 fixed thereto as by a pin 55 for reciprocating movement in the bore 45 of the cylinder portion 44 of cylinder 43.

Movement of the cylinder 43 relative to the piston 54, in one direction, a direction toward stud welding gun 11, is effected by means of a coil spring 56 encircling shaft 40 with one end of the spring abutting end cap bushing 51 and the other end abutting against the piston 54, with movement of these elements relative to each other in the opposite direction being affected by the introduction of a fluid under pressure through an inlet port 57 in the wall 46, this inlet port extending into the variable volume cavity in the cylinder portion 44 formed between the wall 46 and the piston 54 in bore 45. Movement of these elements in this last described direction is limited by means of a cylindrical stop 58 encircling the shaft 40 and spring 56 with one end of this stop in abutment against the end cap bushing 51 and the other end in position to be engaged by the piston 54.

Inlet port 57 is connected by flexible conduit 60 to a conventional push button 61 actuated fluid control valve 62 fixed to the pistol grip portion 17b of the stud welding gun whereby conduit 60, which is normally in communication through the valve 62 with an exhaust port 63 open to the atmosphere can, upon actuation of the push button 61, be placed in fluid flow communication with a conduit 64 secured at one end to the inlet of this valve 62 and is adapted at its other end to be connected by a quick connect coupling 65 to a source, not shown, of fluid under pressure such as pressurized air.

Although any suitable stud holder probe electrode having a suitable means to hold a stud 16 to effect welding of it to a panel can be used, as well as any suitable means to then grip the head of the stud after welding to effect raising of the depressed metal of the damaged panel, in the preferred embodiment, the probe electrode is provided with a collet chuck at its free end and, a pivotal latched mechanism is associated with the probe electrode to retain the stud in the collet chuck of the probe electrode during actuation of the fluid cylinder and piston mechanism to raise the depressed metal portion of the panel.

Thus, in the preferred embodiment illustrated, the stud holder probe electrode 42 is provided with a threaded stub 70 at one end thereof secured in the threaded aperture, provided for this purpose, in the end of piston shaft 40, an intermediate shaft 71 portion extending from the stub shaft 70, to in effect form an extension of the piston shaft 40, and a terminal reduced diameter spindle 72 portion extending axially outward from shaft 71.

Spindle 72 is provided with an axial stepped bore extending from the free end thereof and with a plurality of slots 73 extending through the wall of this portion of the spindle to the stepped bore to provide a plurality of somewhat flexible segments 72a forming a collet chuck at the free end of the spindle, the collet chuck thus formed having a variable inner diameter surface 74 of a desired size to accommodate the head of a stud 16, the head of which would seat against shoulder segments 75 within the enlarged bore portion of spindle 72.

The shaft 71 portion of the probe electrode 42 is provided with opposed flat sides 71a on a portion thereof, with a through bore extending from one of these sides to the other side, this bore being adapted to receive at opposite ends thereof the shouldered bushings 76, whereby a latch 77 can be pivotably supported on the probe electrode 42 by means of a pin 78 journalled in the bushings, the pin 78 being axially retained in the bushings by means of split ring retainers 80 positioned in suitable grooves provided for this purpose in the pin 78 outboard the lugs of latch 77.

Latch 77, as best seen in FIGS. 1 and 2, is substantially U-shaped with spaced apart parallel legs 77a, each having an aperture at one end thereof to receive the pin 78 and at its opposite end being connected by a cross web 77b to the other leg. The cross web 77b is provided with a U-shaped notch 77c extending from a free edge thereof and positioned centrally between the legs 77a. Latch 77 is pivotally supported on probe electrode 42, so that the web portion thereof, when the latch is pivoted in a counterclockwise direction with reference to FIG. 1, will extend slightly beyond the collet chuck end of the probe electrode to have the web 77b engage the underside of the head of a stud previously inserted in the collet chuck, the shank portion of the stud being slidably received in the notch 77c of the web 77b. When the latch 77 is moved to the position just described, the stud 16 will be retained and will move with the probe electrode upon axial movement of the probe electrode.

Figure 3:
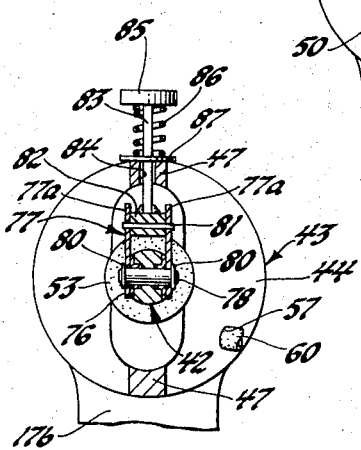
FIG. 3 is a sectional view taken along line 3—3 of FIG. 1 illustrating the pivotal arrangement of the stud latch mechanism.

To effect pivotal movement of latch 77, each of the legs 77a thereof intermediate the ends of these legs is provided with a hole to receive a pin 81 to pivotally support between these legs the tube 82 fixed to one end of a latch actuator pin 83, as seen in FIG. 3, extending through an axially extending, elongated slot 84 in a web leg 47 of cylinder 43. The opposite end of the latch actuator pin 83 has a push cap 85 affixed thereto whereby an operator depressing this push cap downward toward the web leg 47 will cause the latch 77 to pivot in a counterclockwise direction, with reference to FIG. 1, about the axis of pin 78 into latching engagement with a stud 16 positioned in the collet chuck portion of probe electrode 42.

Latch actuator pin 83 is normally biased in an upward direction relative to the web leg 47 moving the push cap 85 away from this web leg, to normally pivot latch 77, in a clockwise direction to the position shown in FIG. 1, by means of a coiled spring 86 encircling this actuator pin in position to abut at one end against the push cap 85 and at its other end against a washer 87 encircling the actuator pin 83 and slidably engaging the outer surface of the web leg 47 adjacent to slot 84.

In operating the subject in-ding repair tool 10, an operator would first insert the head of a stud 16 into the collet chuck end of probe electrode 42 and then position the tool so that this stud is positioned in approximately the center of the in-ding 15a in panel 15. The operator could then push the weld gun 11 toward the panel 15 with sufficient force so that the actuator rod 32 would move to close the contact of limit switch SW-2 after which the operator could trigger the button 31 of switch SW-1 to effect firing the gun to thereby weld the stud 16 to the panel 15.

However, in view of the switch arrangement in the preferred embodiment of the invention, the preferred mode of operation would be to have the operator depress and hold the trigger button 31 of switch SW-1 to close the contacts of this switch and to then have the operator push the stud welding gun 11 toward panel 15 until the actuator rod 32 moves axially in the barrel of the gun a sufficient distance to close limit switch SW-2 to effect firing of the gun and therefore welding of the stud 16 to the panel 15. This mode of operation is preferred since limit switch SW-2 is physically acted upon by actuator rod 32, which is an extension of shaft 25 of the electrode spindle assembly 26 and, since the distance of the shaft 25 travel in the barrel of the weld gun housing before the actuator rod will trigger the limit switch SW-2 is related to the spring force of spring 28, weld quality will be held uniform because the spring pressure that controls the bias force of stud 16 against panel 15 will always be the same when the gun is fired.

After welding of the stud 16 to the panel 15, and while still pressing the welding gun 11 toward this panel, th operator would release the trigger button 31 to permit opening of the contacts of switch SW-1 and then depress the cap 85 of the stud latch mechanism to pivot the latch 77 into latching engagement with the stud 16 beneath the head thereof to axially retain it for movement with the electrode spindle assembly 26. After welding of the stud 16 to the panel 15, the seat portion 48 with the O-ring 50 thereon of the cylinder 43 would be resting on the panel 15.

The operator, while still holding cap 85 depressed, would then depress the push button 61 of the control valve 62 to place the conduit 64 in fluid communication with the cavity in front of the piston 54 in bore 45 of cylindrical portion 44 of cylinder 43 so that fluid under pressure will effect displacement of the piston and the electrode spindle assembly 26 to which it is attached in an axial direction relative to the cylinder 43 which, as described, is in abutment against the panel 15 whereby the in-ding 15a area of the panel is raised close to or slightly above the normal planar surface of panel 15. After this occurs, th operator would release the push button 61 of the control valve 62 whereby the piston cavity would be disconnected from fluid communication with the conduit 64 and placed in communication with the exhaust port 63. The operator would then also release the stud latch mechanism to permit removal of the tool from the stud 16.

What is claimed is:

1. A hand-held and operated in-ding repair tool including an electric stud welding gun comprising a gun housing including a pistol grip and a barrel having an axial stepped bore containing the operating components of said gun including an electrode spindle having one end thereof positioned in said bore for limited forward and rearward axial movement therein and having its other end which includes a weld stud retaining chuck at the free end thereof extending outward from the front of said barrel, resilient means positioned in said barrel to bias said electrode spindle in a forward axial direction, electrical weldng power means extending through said pistol grip and being operatively connected at one end to said electrode spindle, said electrical welding power means including an operator controlled switch mounted on said pistol grip of said gun housing, a piston fixed to said electrode spindle intermediate the ends thereof and exteriorly of said gun housing, cylinder means including a cylinder slidaby encircling said other end of said electrode spindle and said piston to form with one side of said piston a variable volume fluid chamber, means engaging the other side of said piston and engaging said cylinder to normally bias said cylinder means toward said gun housing, conduit means connected at one end to said cylinder means in fluid communication with said variable volume chamber, operator controlled valve means mounted on said gun housing and connected to the other end of said conduit means and connectable to a source of pressurized fluid, said valve means being operable for selectively connecting said conduit means to a source of pressurized fluid and to the atmosphere, said cylinder means including an annular panel engageable foot member encircling said other end of said electrode spindle adjacent to said chuck and, manually operable latch means pivotally connected to said electrode spindle for movement relative to said chuck between a stud retaining position and a stud release position.

2. A in-ding repair tool according to claim 1 wherein said cylinder mean includes an annular foot and axial extending, spaced apart web legs interconnecting said cylinder with said foot with one of said web legs having an axial extending elongated slot therethrough and wherein said latch means includes a U-shaped latch pivotally supported on said electrode spindle and having a stud engaging portion, a latch acutator pivotally connected at one end to said latch and having its other end extending through said slot in said one web leg and, spring means operatively connected to said latch actuator to normally bias said latch to said stud release position.

3. A in-ding repair tool according to claim 1 wherein said electrical welding power means includes a normally open second switch connected in series with said operator controlled switch, said second switch being positioned in said barrel for actuation by said electrode spindle upon rearward movement thereof.

4. A hand-held, in-ding repair tool usable for welding a stud to an in-ding in a sheet metal panel and then pulling the in-ding out by means of the previously welded stud, said in-ding repair tool including a stud welding gun including a gun housing having a pistol grip and a barrel with said barrel having an axial stepped bore therein opening to the front of said barrel an electrode spindle having a first shaft portion positioned in said stepped bore of said barrel for limited reciprocal forward and rearward movement therein, resilient means positioned in said barrel engaging said first shaft portion to normally bias said first shaft portion in an axial direction forward toward the front of said barrel, said electrode spindle further including a second shaft portion extending at one end from said first shaft portion outward from the front of said barrel and carrying at its opposite end a stud holder probe electrode having a collet chuck at its free end adapted to releasably support a weld stud, a piston fixed to said second shaft portion for axial movement therewith, a cylinder means including a fluid cylinder and a foot positioned axially outward from said cylinder adapted to encircle said collet chuck, said second shaft portion being reciprocally journalled in said cylinder means with said piston positioned in said cylinder for reciprocal movement therein, said piston forming with said cylinder on one side of said piston a variable volume chamber, spring means positioned in said cylinder on the other side of said piston to normally bias said cylinder means in an axial direction whereby said foot is moved in a direction toward said collet chuck, inlet port means in said cylinder in communication with said variable volume chamber, conduit means including a valve, said conduit means being connected at one end to said inlet port means and selectively connected at its other end by said valve to a source of pressurized aeriform fluid and to the atmosphere, manually operable pivotable latch means operatively connected to said stud holder probe electrode to releasably secure a weld stud retained in said collet chuck for axial movement with said electrode spindle assembly and, electrical welding power means, including an operator controlled switch on said pistol grip, said electrical welding power means being electrically connected to said first shaft portion to effect welding of a weld stud retained by said collet chuck.

5. An in-ding repair tool according to claim 4 wherein said cylinder means includes axial extending, spaced apart web legs interconnecting said fluid cylinder with said foot with one of said web legs having an axial extending elongated slot therethrough and wherein said pivotable latch means includes a U-shaped latch pivotally supported on said stud holder probe electrode, a latch acutator pivotally connected at one end to said latch and having its other end extending through said slot in said one web leg and spring means operatively connected to said latch actuator to normally bias said latch to a stud release position.

6. An in-ding repair tool according to claim 5 wherein said electrical welding power means includes a normally open second switch connected in series with said operator controlled switch, said second switch being positioned in said barrel for actuation by said first shaft portion upon rearward movement thereof.

* * * * *